(12) United States Patent
Yamane et al.

(10) Patent No.: US 8,180,557 B2
(45) Date of Patent: May 15, 2012

(54) TRAFFIC STATE PREDICTING APPARATUS

(75) Inventors: Kenichiro Yamane, Ibaraki (JP);
Hirotaka Takahashi, Ibaraki (JP);
Mariko Okude, Ibaraki (JP)

(73) Assignee: Xanavi Informatics Corporation, Zama-shi (JP)

( * ) Notice: Subject to any disclaimer, the term of this patent is extended or adjusted under 35 U.S.C. 154(b) by 1234 days.

(21) Appl. No.: 11/836,551

(22) Filed: Aug. 9, 2007

(65) Prior Publication Data
US 2008/0077316 A1 Mar. 27, 2008

(30) Foreign Application Priority Data
Sep. 27, 2006 (JP) .................................. 2006-262056

(51) Int. Cl.
*G08G 1/123* (2006.01)
(52) U.S. Cl. ........................................ 701/119; 701/117
(58) Field of Classification Search .................. 701/117, 701/118, 119, 204; 340/995.13, 995.27
See application file for complete search history.

(56) References Cited

U.S. PATENT DOCUMENTS

| | | | |
|---|---|---|---|
| 6,522,970 B2* | 2/2003 | Kerner | 701/117 |
| 6,813,555 B1* | 11/2004 | Kerner | 701/117 |
| 2004/0225437 A1 | 11/2004 | Endo et al. | |
| 2005/0093720 A1* | 5/2005 | Yamane et al. | 340/995.13 |
| 2006/0055565 A1* | 3/2006 | Kawamata et al. | 340/995.13 |
| 2006/0064234 A1* | 3/2006 | Kumagai et al. | 701/117 |
| 2009/0088962 A1* | 4/2009 | Jones | 701/200 |

FOREIGN PATENT DOCUMENTS

| | | |
|---|---|---|
| DE | 197 25 556 A1 | 12/1998 |
| DE | 199 28 082 A1 | 12/2000 |
| DE | 199 35 769 A1 | 2/2001 |
| DE | 10 2004 005 750 A1 | 9/2004 |
| DE | 103 50 679 A1 | 6/2005 |
| JP | 2006-171835 A | 6/2006 |

OTHER PUBLICATIONS

German Office Action dated Sep. 6, 2010 including English translation (Fifteen (15) pages).

\* cited by examiner

*Primary Examiner* — Khoi Tran
*Assistant Examiner* — Spencer Patton
(74) *Attorney, Agent, or Firm* — Crowell & Moring LLP

(57) ABSTRACT

A traffic state predicting apparatus, which predicts congestion states of parts of a link based on limited information (the travel time for the link), comprises storage means that stores link data including a link length of each link forming part of a road on a map and parameters including, for each link, a smooth traffic speed indicting being smooth, a congested traffic speed indicating being congested, and a congestion reference position which is a reference position for a congested section; means that acquires a predicted travel time for the link; and congestion degree classified section calculating means that obtains sections classified according to their level of congestion in the link with use of the predicted travel time and the parameters.

3 Claims, 13 Drawing Sheets

310

| | | | |
|---|---|---|---|
| | INFORMATION CREATION TIME | | 311 |
| | NUMBER OF MESH INFO PIECES | | 312 |
| MESH INFO PIECE | MESH CODE | | 314 |
| | NUMBER OF LINK INFO PIECES | | 315 |
| | LINK INFO PIECE | LINK CLASSIFICATION | 317 |
| | | LINK NUMBER | 318 |
| | | REPRESENTATIVE LEVEL OF CONGESTION | 319 |
| | | TRAVEL TIME | 320 |
| | | NUMBER OF CONGESTED SECTIONS | 321 |
| | | CONGESTED SECTION INFO PIECE — SECTION LEVEL OF CONGESTION | 323 |
| | | CONGESTED SECTION INFO PIECE — BOTTLENECK POSITION (DISTANCE FROM LINK END) | 324 |
| | | CONGESTED SECTION INFO PIECE — CONGESTION LENGTH | 325 |

| | | | |
|---|---|---|---|
| INFORMATION CREATION TIME | | | — 311 |
| NUMBER OF MESH INFO PIECES | | | — 312 |
| MESH INFO PIECE | MESH CODE | | — 314 |
| | NUMBER OF LINK INFO PIECES | | — 315 |
| | LINK INFO PIECE | LINK CLASSIFICATION | — 317 |
| | | LINK NUMBER | — 318 |
| | | REPRESENTATIVE LEVEL OF CONGESTION | — 319 |
| | | TRAVEL TIME | — 320 |
| | | NUMBER OF CONGESTED SECTIONS | — 321 |
| | | CONGESTED SECTION INFO PIECE — SECTION LEVEL OF CONGESTION | — 323 |
| | | BOTTLENECK POSITION (DISTANCE FROM LINK END) | — 324 |
| | | CONGESTION LENGTH | — 325 |
| | | — 322 | |
| | — 316 | | |
| — 313 | | | |

| | | | |
|---|---|---|---|
| | | | INFORMATION CREATION TIME — 331 |
| | | | NUMBER OF PREDICTING TIME — 332 |
| | | | PREDICTING TIME — 334 |
| | | | NUMBER OF MESH INFO PIECES — 335 |
| | | | MESH CODE — 337 |
| | | | NUMBER OF LINK INFO PIECES — 338 |
| | | | LINK CLASSIFICATION — 340 |
| | | | LINK NUMBER — 341 |
| | | | REPRESENTATIVE LEVEL OF CONGESTION — 342 |
| | | | PREDICTED TRAVEL TIME — 343 |
| | | | NUMBER OF CONGESTED SECTIONS — 344 |
| | | | SECTION LEVEL OF CONGESTION — 346 |
| | | | BOTTLENECK POSITION (DISTANCE FROM LINK END) — 347 |
| | | | CONGESTION LENGTH — 348 |
| PREDICTING TIME INFO PIECE — 333 | MESH INFO PIECE — 336 | LINK INFO PIECE — 339 | CONGESTED SECTION INFO PIECE — 345 |

(1) WHEN NUMBER OF CONGESTED SECTIONS = 0
NO FIELD OF CONGESTED SECTION INFO PIECE

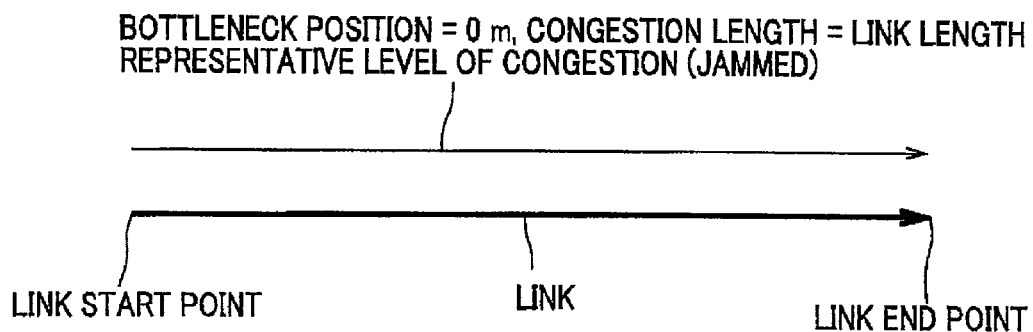

BOTTLENECK POSITION = 0 m, CONGESTION LENGTH = LINK LENGTH
REPRESENTATIVE LEVEL OF CONGESTION (JAMMED)

(2) WHEN NUMBER OF CONGESTED SECTIONS > 0
FIELD OF CONGESTED SECTION INFO PIECE EXISTS

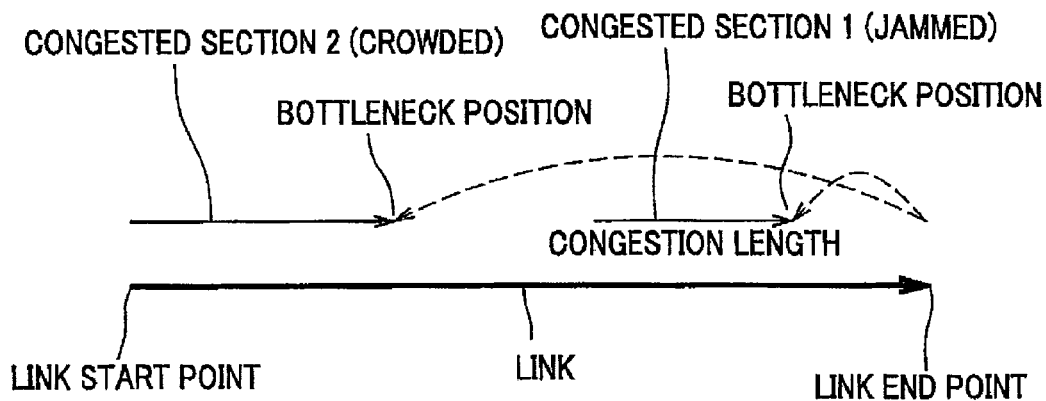

SECTIONS NOT CLASSIFIED AS CONGESTED ARE REGARDED AS SMOOTH

|  | SECTION LEVEL OF CONGESTION | BOTTLENECK POSITION | CONGESTION LENGTH |
|---|---|---|---|
| CONGESTED SECTION 1 | 3 (JAMMED) | 100m | 200m |
| CONGESTED SECTION 2 | 2 (CROWDED) | 500m | 65534m (INDICATING LINK START POINT) |

FIG.8

SPEED CANDIDATE TABLE OF SMOOTH AND CONGESTED TRAFFIC SPEEDS

350

| LINK |
|---|
| ** |
| ** |
| ** |
| ** |
| ⋮ |

| SMOOTH | CONGESTED |
|---|---|
| 60 | 28 | → PERCENTILE VALUE : 100
| 59 | 27 |
| 59 | 27 |
| 58 | 25 |
| 57 | 25 |
| ⋮ | ⋮ |
| ⋮ | · | → 50
| ⋮ | ⋮ |
| ⋮ | · | → 20
| ⋮ | ⋮ |

⬇

SMOOTH AND CONGESTED TRAFFIC SPEEDS-FOR-DIFFERENT
PERCENTILE VALUES TABLE

360

| LINK | PERCENTILE VALUES | SMOOTH | CONGESTED |
|---|---|---|---|
| ** | 20 | 35 | 15 |
| ** | 30 | 39 | 18 |
| ** | 40 | 42 | 19 |
| ** | 50 | 44 | 22 |
| ⋮ | ⋮ | ⋮ | ⋮ |

$X_i$: SUM OF SECTIONS WHERE PREDICTED VALUES AGREE WITH TRUE VALUES
LINK LENGTH: L
EVALUATED VALUE $E = X_i/L$

370

| NUMBER OF MESH INFO PIECES | | | 371 |
|---|---|---|---|
| MESH INFO PIECE | MESH CODE | | 373 |
| | NUMBER OF LINK INFO PIECES | | 374 |
| | LINK INFO PIECE | LINK CLASSIFICATION | 376 |
| | | LINK NUMBER | 378 |
| | | 1ST BOTTLENECK POS. | 379 |
| | | 2ND BOTTLENECK POS. | 380 |
| | | 3RD BOTTLENECK POS. | 381 |
| | | CONGESTED TRAFFIC SPEED | 382 |
| | | SMOOTH TRAFFIC SPEED | 383 |

CONGESTION DETERMINING THRESHOLDS

| LINK CLASSIFICATION | SMOOTH | CROWDED | JAMMED |
|---|---|---|---|
| 0 | 60km/h or above | 60~40km/h | 40km/h or below |
| 1 | 40km/h or above | 40~20km/h | 20km/h or below |
| 2 | 20km/h or above | 20~10km/h | 10km/h or below |

TRAFFIC STATE PREDICTING APPARATUS

CROSS-REFERENCE TO RELATED APPLICATIONS

The present application claims priority from Japanese Patent Application No. 2006-262056 filed on Sep. 27, 2006, which is herein incorporated by reference.

BACKGROUND OF THE INVENTION

1. Field of the Invention

The present invention relates to a technique that predicts traffic states.

2. Description of the Related Art

Japanese Patent Application Laid-Open Publication No. 2006-171835 describes a technique that obtains the level of congestion on a link. For example, a travel speed is obtained from the travel time and link length of a link, and the level of congestion corresponding to the obtained travel speed is taken as the level of congestion on the link.

However, even for one link, the traffic state is not necessarily the same from its start point to its end point. For example, if an intersection or a slope exists at some point on the link, congestion may occur starting from that point. That is, sections in the one link may differ in their congestion state. With the conventional technique, the detailed congestion states (sections classified according to their level of congestion) of a link cannot be obtained even if the travel time of the link is obtained.

SUMMARY OF THE INVENTION

The present invention was made in order to solve the above problem and is to predict the congestion states of the sections of the link from limited information (e.g., the travel time of a link or the like).

In order to solve the above problem, in the present invention, the sections of the link are classified according to their level of congestion by use of a predicted travel time and predictive parameters.

According to a first aspect of the present invention, there is provided a traffic state predicting apparatus comprising storage means that stores link data including a link length of each link forming part of a road on a map and parameters including, for each link, a smooth traffic speed which indicates smooth traffic, a congested traffic speed which indicates congested traffic, and a congestion reference position, which is a reference position for a congested section; means that acquires a predicted travel time for the link; and congestion degree classifying section calculating means that obtains sections classified according to their level of congestion in the link with use of the predicted travel time and the parameters.

According to a second aspect of the present invention, there is provided a traffic state predicting apparatus comprising means that acquires traffic information including a travel time for each link forming part of a road on a map, sections classified according to their level of congestion in the link, congestion reference positions that are each a reference position for congestion, and a congestion length; and parameter creating means that creates parameters to be used when obtaining sections classified according to their level of congestion in the links with use of the traffic information. The parameters include, for each link, a smooth traffic speed (which indicates smooth traffic), a congested traffic speed (which indicates congested traffic), and congestion reference positions which are each a reference position for a congested section.

BRIEF DESCRIPTION OF THE DRAWINGS

For more complete understanding of the present invention and the advantages thereof, reference is now made to the following description taken in conjunction with the accompanying drawings wherein:

FIG. 2 shows the configuration of a traffic information DB;

FIG. 3 shows the configuration of a predicted traffic information DB;

FIG. 4 illustrates bottleneck positions of congested sections;

FIG. 8 is a diagram illustrating the process of calculating smooth & congested traffic speeds for different percentile values;

FIG. 15 shows a congestion determining threshold table.

DETAILED DESCRIPTION OF THE INVENTION

Figure 1:
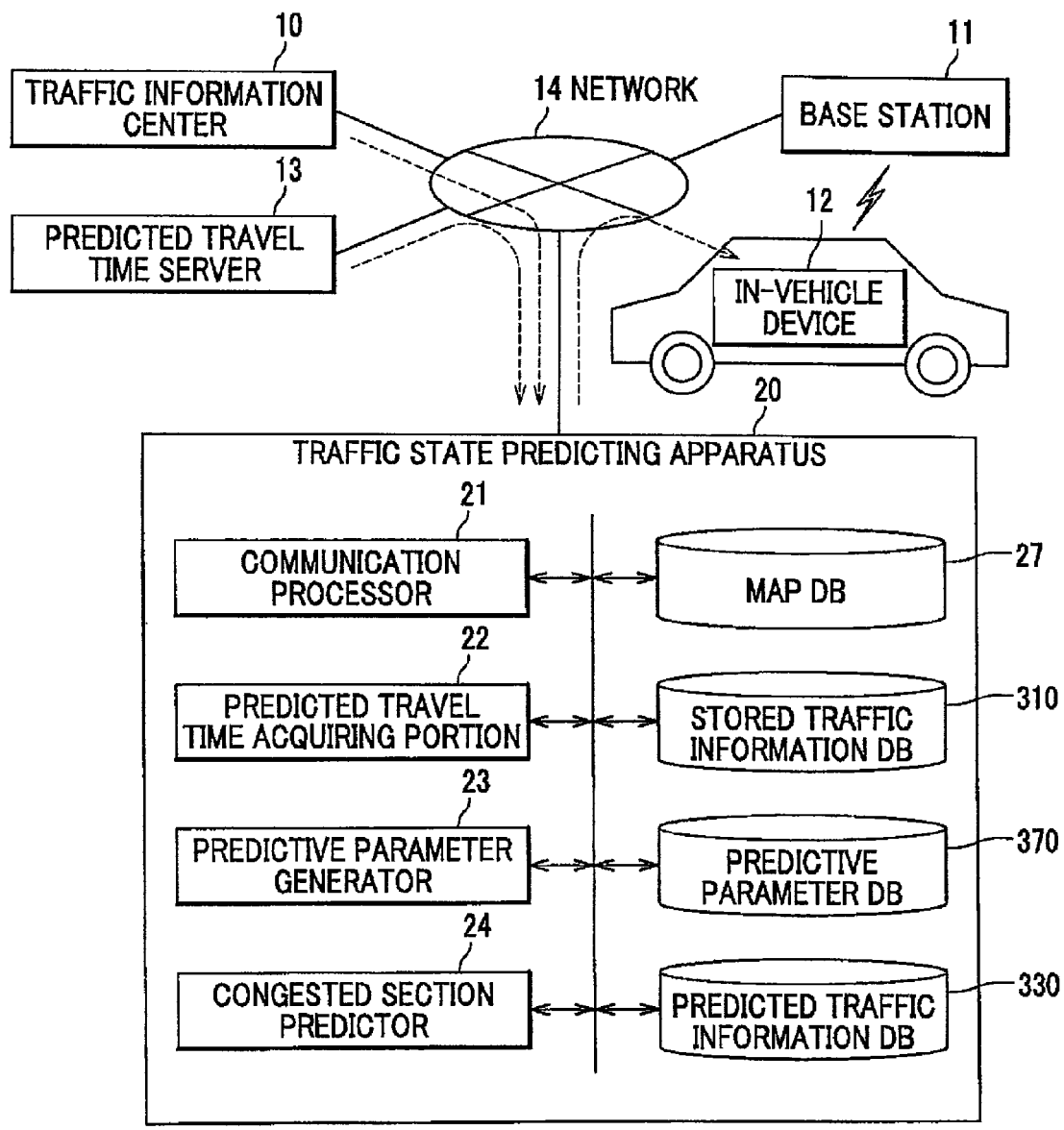
FIG. 1 is a schematic view of the configuration of a traffic state predicting system according to one embodiment of the present invention.

An embodiment of the present invention will be described below with reference to the drawings. FIG. 1 illustrates schematically the configuration of a traffic state predicting system according to the embodiment of the present invention. The traffic state predicting system comprises a traffic information center 10, a predicted travel time server 13, and an in-vehicle device 12 such as a navigation device mounted in a vehicle, as shown in the Figure.

The traffic information center 10 is an apparatus that distributes current traffic information, or specifically, traffic information (the travel time, the level of congestion, etc.) of the links forming a road on a map. The traffic information center 10 may be, for example, a VICS (Vehicle Information and Communication System) center, or an apparatus that once stores VICS information and after processing, distributes the information.

The predicted travel time server 13 comprises a storage, holds predicted travel times at time points in the future for each of the links forming roads on a map, and transmits the predicted travel times for each link to a traffic state predicting apparatus 20.

The traffic information center 10, the predicted travel time server 13, the traffic state predicting apparatus 20, and the in-vehicle device 12 each can be connected to a network 14 such as the Internet. The in-vehicle device 12 is connected to the network 14 via a base station 11 by radio. The traffic state predicting apparatus 20 transmits and receives information to and from the traffic information center 10 and the in-vehicle device 12 via the network 14. The in-vehicle device 12 can receive current traffic information from the traffic information center 10.

The predicted travel time server 13 may be directly connectable to the traffic state predicting apparatus 20, or the traffic state predicting apparatus 20 may have the function of the predicted travel time server 13.

The traffic information center 10, the predicted travel time server 13, and the traffic state predicting apparatus 20 are each embodied by a general-purpose computer system that comprises a CPU (Central Processing Unit), a RAM (Random Access Memory) as a work area of the CPU, an external storage such as an HDD (Hard Disk Drive), a communication interface, an input device such as a keyboard, an output device such as a display, and a bus for connecting these. The functions of the center, server, and apparatus are each realized by the CPU executing a predetermined program loaded in memory.

The in-vehicle device 12 is a so-called car navigation device that comprises a CPU, a RAM, an HDD, a GPS (Global Positioning System) receiver, various sensors (a vehicle speed sensor, a gyro sensor, etc.) that acquire the states of the vehicle, a display, an input device such as a key switch, an external storage, a communication device, and the like. The in-vehicle device 12 holds map data in its storage, searches for a path from a given start point to a destination, and displays the path on the display. The in-vehicle device 12 displays traffic information obtained from the traffic information center 10 or the traffic state predicting apparatus 20 on the display. The in-vehicle device 12 displays, for example, a map of the neighborhood around its current position, and the levels of congestion (smooth, crowded, jammed, etc.) on roads of the map.

The traffic state predicting apparatus 20 comprises a communication processor 21, a predicted travel time acquiring portion 22, a predictive parameter generator 23, a congested section predictor 24, a map DB (Data Base) 27, a traffic information DB 310, a predictive parameter DB 370, and a predicted traffic information DB 330.

The communication processor 21 transmits and receives information to and from the traffic information center 10, the predicted travel time server 13, and the traffic state predicting apparatus 20. To be specific, the communication processor 21 regularly receives current traffic information from the traffic information center 10 and stores it in the traffic information DB 310. Further, in response to a request from the in-vehicle device 12, the communication processor 21 obtains a requested range of traffic information from the predicted traffic information DB 330 and transmits it to the in-vehicle device 12. The predicted travel time acquiring portion 22 acquires a predicted travel time for each link at a given time point in the future via the communication processor 21 from the predicted travel time server 13.

The predictive parameter generator 23 creates predictive parameters from which to calculate the levels of congestion to be stored into the predicted traffic information DB 330 with use of the traffic information DB 310 and stores the predictive parameters into the predictive parameter DB 370.

The congested section predictor 24 obtains the levels of congestion for each link with use of the predictive parameter DB 370 and the predicted travel time acquired from the predicted travel time server 13 and stores them into the predicted traffic information DB 330.

Contained in the map DB (Data Base) 27 are a mesh code for each of the mesh areas, into which a region on a map is partitioned, and data about the links (link data) that form the roads included in the mesh area, the mesh areas being areas partitioned according to their latitude and longitude of predetermined intervals. The link data contains a link number, a link classification that is a road type, position information (coordinates of the start and end points), and a link length. Each link is uniquely identified by its mesh code and link number.

FIG. 2 shows the configuration of the traffic information DB 310. The traffic information DB 310 stores traffic information received from the traffic information center 10. As shown in the Figure, the traffic information DB 310 comprises an information creation time 311, number of mesh information pieces 312, and an equal number of mesh information pieces 313 to the number of mesh information pieces 312. The mesh information piece 313 comprises a mesh code 314, number of link information pieces 315, and an equal number of link information pieces 316 to the number of link information pieces 315. The link information piece 316 comprises a link classification 317, a link number 318, a representative congestion level 319, a travel time 320, number of congested sections 321, an equal number of congested section information pieces 322 to the number of congested sections 321. The congested section information piece 322 comprises a congested section level 323, a bottleneck position (distance from the end point of the link) 324, and a congestion length 325.

The representative congestion level 319 and the congested section level 323 are expressed as numerical values, i.e., "0 (unknown)", "1 (smooth)", "2 (crowded)", and "3 (jammed)". The number of congested sections 321 is the number of the congested sections when one link has a plurality of congested sections. The congested section level 323 is the level of congestion for a section. The bottleneck position 324 will be described later.

FIG. 3 shows the configuration of the predicted traffic information DB 330. The predicted traffic information DB 330 has a configuration similar to that of the traffic information DB 310, but stores an equal number of records to the number of predicting time points. That is, the predicted traffic information DB 330 comprises information creation time 331, number of predicting time points 332, and an equal number of predicting time point information pieces 333 to the number of predicting time points 332. The predicting time point information piece 333 comprises a predicting time point 334, number of mesh information pieces 335, and an equal number of mesh information pieces 336 to the number of mesh information pieces 335. The mesh information piece 336 comprises a mesh code 337, number of link information pieces 338, and an equal number of link information pieces 339 to the number of link information pieces 338. The link information piece 339 comprises a link classification 340, a link number 341, a representative congestion level 342, a travel time 343, number of congested sections 344, an equal number of congested section information pieces 345 to the number of congested sections 344. The congested section information piece 345 comprises a congested section level 346, a bottleneck position (distance from the end point of the link) 347, and a congestion length 348.

The predicted traffic information DB 330 basically contains traffic information received from the predicted travel time server 13, but the traffic information from the predicted travel time server 13 does not contain information on levels of congestion (the representative congestion level 342, the number of congested sections 344, and the congested section information 345). This information on levels of congestion is produced by the congested section predictor 24 based on a predicted travel time 343 with use of the predictive parameter DB 370 and is stored.

FIG. 4 illustrates the bottleneck positions 324. If a point where the incline changes such as an intersection or a slope exists in a link, congestion may occur due to the presence of the point. The congestion occurs running from the point toward the link start point. The bottleneck position 324 refers to the point causing the congestion and is a reference point of the congested section. When seen from a running vehicle, the bottleneck position 324 is the end point of the congestion. The bottleneck position 324 is expressed as the distance from the end point of the link. For example, as shown in (1) of FIG. 4, if the number of congested sections 321 is at "0", the field of the congested section information piece 322 is not present, and the representative congestion level 319 becomes the level of congestion for the link. Further, the bottleneck position is set to "0" and the congestion length becomes the link length (obtained from the map data). In contrast, as shown in (2) of FIG. 4, if the number of congested sections 321 is at "1" or above, the field of the congested section information piece 322 is present, and the section that runs from the bottleneck position 324 back toward the link start point by the congestion length 325 is a congestion section.

<Description of the Operation>

The operation of the traffic state predicting apparatus 20 of this embodiment will be described below.

As mentioned above, the communication processor 21 regularly receives current traffic information from the traffic information center 10 and stores it in the traffic information DB 310.

Meanwhile, the predictive parameter generator 23 creates the predictive parameter DB 370 using the traffic information DB 310 regularly or in response to a request from an operator.

Figure 5:
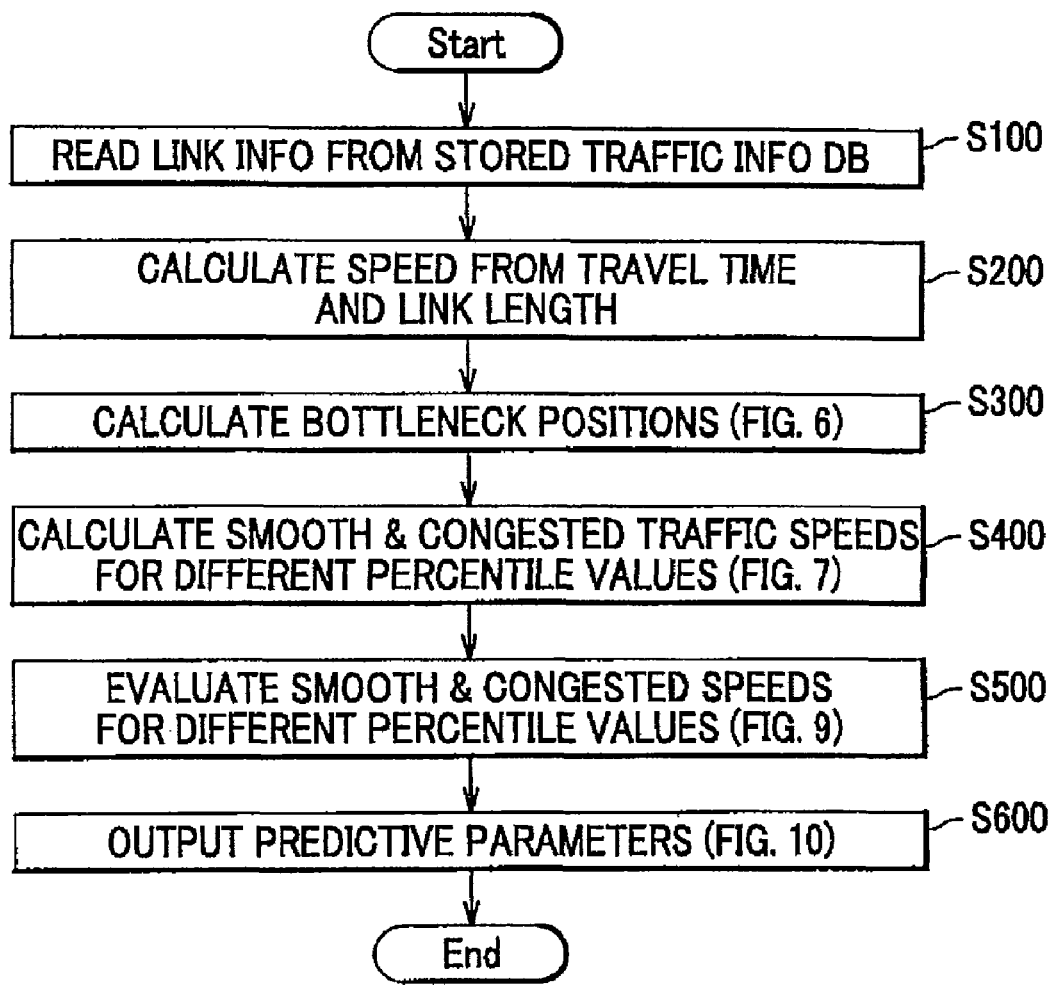
FIG. 5 is a flow diagram of the process of creating a predictive parameter DB.

FIG. 5 is a flow diagram showing the process of creating the predictive parameter DB 370. The process of creating the predictive parameter DB 370 is an off-line process because no communication with the outside is needed.

The predictive parameter generator 23 reads the traffic information DB 310 (S100). Note that the generator 23 may read in the information pieces whose information creation time 311 are within a given time period (e.g., back to one week before), or may read in the information pieces about the links in a given region (e.g., the information pieces whose mesh codes 314 are within a given range).

Next, the predictive parameter generator 23 obtains the travel speed of the corresponding link for each link information piece 316 included in the traffic information DB 310 read at S100 (S200). To be specific, the predictive parameter generator 23 acquires the link length of the link of interest from the map data. As mentioned above, the link is identified by the mesh code 314 and the link number 318. Then, the predictive parameter generator 23 calculates the travel speed by dividing the link length acquired from the map data by the travel time 320.

Next, the predictive parameter generator 23 calculates bottleneck positions (S300). Here, the occurrence frequencies of the bottleneck positions are obtained and bottleneck positions highest in occurrence frequency are identified. This is because there is regularity among the occurrence locations of bottleneck positions in a link from which congestion occurs. Although actual positions from which congestion occurs may take on various locations on the road, variation of the bottleneck positions is limited somehow because traffic information is collected with sensors installed at predetermined positions on the road.

Figure 6:
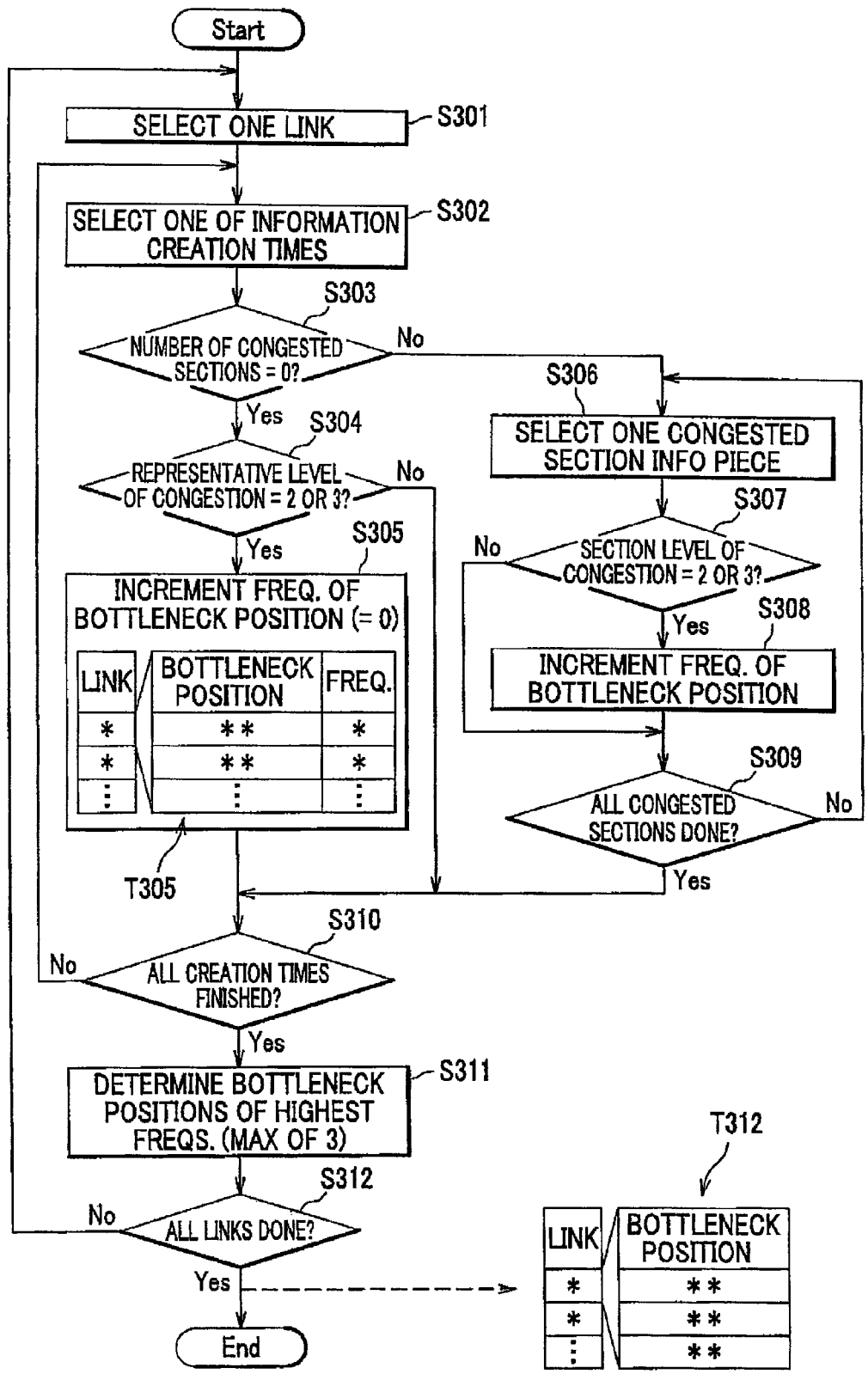
FIG. 6 is a flow diagram of the process of calculating bottleneck positions.

FIG. 6 is a flow diagram of the calculation of bottleneck positions.

The predictive parameter generator 23 sequentially selects one link from the links corresponding to the link information pieces 316 included in the traffic information DB 310 read at S100 (S301). Then, the predictive parameter generator 23 selects one information creation time from the information creation times 311 sequentially in the order in which they were created (S302).

The predictive parameter generator 23 extracts the link information piece 316 whose information creation time 311 is the one selected at S302 and corresponding to the link selected at S301 from the link information pieces 316 included in the traffic information DB 310 read at S100. Then, it is determined whether the number of congested sections 321 of the extracted link information piece 316 is at "0" (S303). If the number of congested sections 321 is at "0" (Yes at S303), the predictive parameter generator 23 determines whether or not the representative congestion level 319 is at "2" or "3" (S304). If the representative congestion level 319 is not at "2" or "3" (No at S304), the process proceeds to S310. Note that for simplicity of the process, the level of congestion=2 (crowded) and the level of congestion=3 (jammed) are not distinguished.

In contrast, if the representative congestion level 319 is at "2" or "3" (Yes at S304), the predictive parameter generator 23 updates a bottleneck position frequency table T305 (S305). In the bottleneck position frequency table T305, bottleneck positions are associated with frequencies for each link. Here, the predictive parameter generator 23 increments the frequency of the bottleneck position that is at "0" of the link of interest (S305). Then, the process proceeds to S310.

In contrast, if the number of congested sections 321 of the link information piece 316 is not at "0" (No at S303), the predictive parameter generator 23 sequentially selects one from the congested section information pieces 322 (S306) and determines whether or not the congested section level 323 is at "2" or "3" for each congested section information piece 322 (S307). Only if so (Yes at S307), the predictive parameter generator 23 updates the bottleneck position frequency table T305. That is, the predictive parameter generator 23 increments the frequency of the bottleneck position 324 (S308). When all congested section information pieces 322 have been selected (Yes at S309), the process proceeds to S310.

At S310, the predictive parameter generator 23 determines whether all information creation times 311 of the records included in the traffic information DB 310 read at S100 have been selected at S302 (S310). If not yet done (No at S310), the process returns to S302, where an information creation time 311 having not been selected is selected, and the later processes are performed.

In contrast, when all times of information creation 311 have been selected (Yes at S310), the predictive parameter generator 23 registers bottleneck positions of highest frequencies (here, first to third highest frequencies) from the bottleneck position frequency table T305 (S305) into a bottleneck position table T312 (S311).

Next, the predictive parameter generator 23 determines whether the selection at S301 has finished for all links (S312). Then, when a link having not been selected exists (No at S312), the process returns to S301, where the link is selected, and the later processes are performed.

On the other hand, if all links have been selected (Yes at S312), the predictive parameter generator 23 ends this flow.

The flow of the calculation of bottleneck positions has been described in the above. By this process, the predictive parameter generator 23 completes the bottleneck position table T312. For each link, bottleneck positions of first to third highest frequencies are stored in the bottleneck position table T312.

Figure 7:
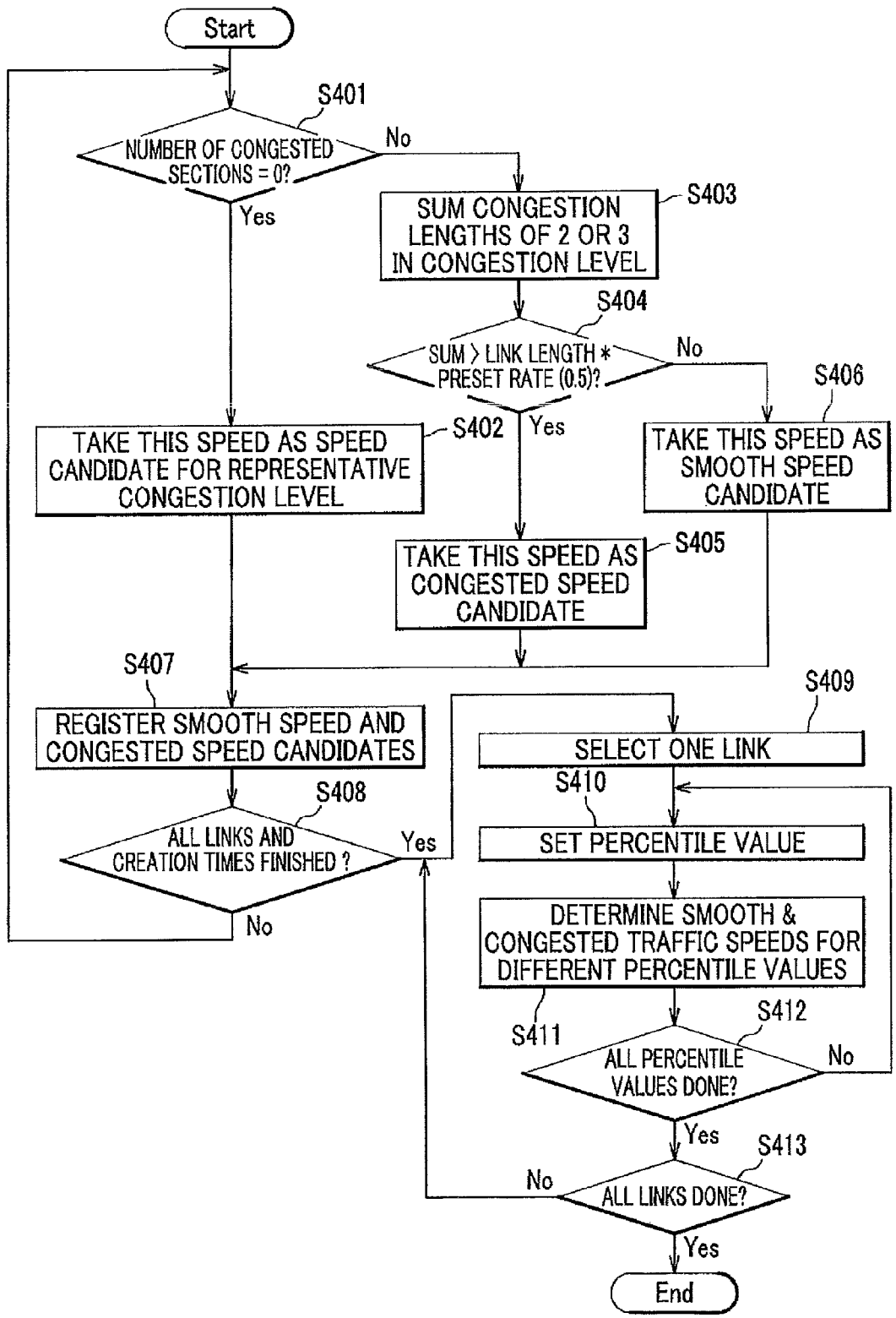
FIG. 7 is a flow diagram of the process of calculating smooth & congested traffic speeds for different percentile values.

Having returned to FIG. 5, the predictive parameter generator 23 calculates smooth and congested traffic speeds for different percentile values (S400). FIG. 7 is a flow diagram of that process. For each link information piece 316 (i.e., for each link and for each information creation time point), speeds (smooth traffic speeds) on the link sections which are perceived as smooth and speeds (congested traffic speeds) on the link sections which are perceived as congested are obtained (S401-S408). Then, for each link, candidates for the smooth traffic speed and congested traffic speed corresponding to a predetermined percentile value are obtained (S409-S413).

To be specific, first, the predictive parameter generator 23 sequentially selects one from the link information pieces 316 included in the traffic information DB 310 read at S100 as a link information piece to be processed. Then, the predictive parameter generator 23 determines whether the number of congested sections 321 of the selected link information piece is at "0" (S401). If the number of congested sections 321 is at "0" (Yes at S401), the predictive parameter generator 23 takes the travel speed on the corresponding link obtained at S200 as a speed candidate for the representative congestion level 319 (S402).

On the other hand, if the number of congested sections 321 of the selected link information piece 316 is not at "0" (No at S401), the predictive parameter generator 23 extracts the congestion lengths 325 of the congested section information pieces 322 whose congested section level 323 is at "2" or "3" from the congested section information pieces 322 and obtains the sum of the extracted congestion lengths 325 (S403). Then, it is determined whether the sum is greater than the link length of the link of interest multiplied by a predetermined coefficient (e.g., of 0.5) (S404). This is because, if the sum of the lengths of the congested sections is at about a certain value or greater, the link is taken as being congested.

If the sum of the congestion lengths is greater (Yes at S404), the predictive parameter generator 23 takes the corresponding travel speed obtained at S200 as a congested traffic speed candidate (S405). In contrast, if the sum of the congestion lengths is not greater (No at S404), the predictive parameter generator 23 takes the travel speed obtained at S200 as a smooth traffic speed candidate (S406).

Then, the predictive parameter generator 23 registers each speed candidate. To be specific, as shown in FIG. 8, smooth traffic speed candidates and congested traffic speed candidates are respectively registered in ascending order (or descending order) for each link, regardless of the information creation time 311.

The predictive parameter generator 23 performs the processes of S401-S407 for all information creation time points of all links. As shown in FIG. 8, a speed candidate table 350 storing the smooth traffic speeds and congested traffic speeds of each link is completed (S408).

Next, the predictive parameter generator 23 sequentially selects one link (S409), sequentially sets percentile values (S410), and determines smooth and congested traffic speeds for different percentile values (S411).

The percentile value is a value when the total number of candidates is 100. Where n number of speed candidates are arranged in ascending order, a speed candidate for a percentile value m is located m×n/100-th from the bottom.

As shown in FIG. 8, for each link the predictive parameter generator 23 extracts speed candidates corresponding to percentile values of 20, 30, 40, . . . , 80 from the speed candidate table 350 storing the smooth traffic speeds and congested traffic speeds, and stores them in a smooth and congested traffic speeds-for-different percentile values table 360 (S412). In the smooth and congested traffic speeds-for-different percentile values table 360, a percentile value is associated with a smooth traffic speed and a congested traffic speed.

When the predictive parameter generator 23 completes the smooth and congested traffic speeds-for-different percentile values table 360 in this way (Yes at S413), the flow is ended.

Figure 9:
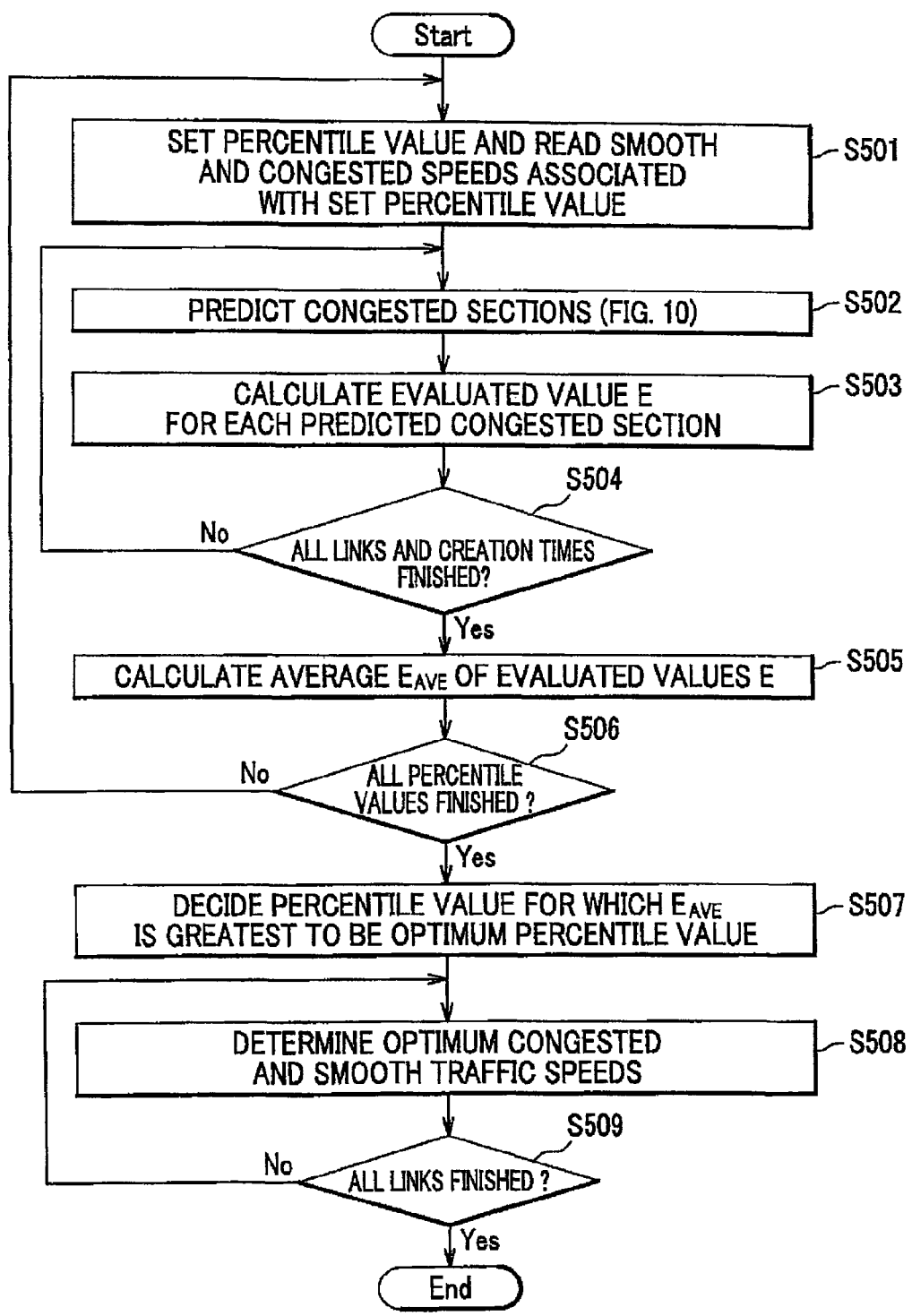
FIG. 9 is a diagram illustrating the process of evaluating smooth & congested traffic speeds for different percentile values.

Next, the predictive parameter generator 23 evaluates the smooth traffic speeds and congested traffic speeds for different percentile values (S500 in FIG. 5). FIG. 9 is a flow diagram of that process.

The predictive parameter generator 23 sequentially sets percentile values and reads the smooth traffic speed Vs and congested traffic speed Vj associated with the set percentile value from the smooth and congested traffic speeds-for-different percentile values table 360 (S501). Then, the predictive parameter generator 23 sequentially selects one from the link information pieces 316 and predicts congested sections for the link corresponding to the selected link information piece 316 (S502) and calculates an evaluated value E for the predicted congested sections (S503).

Figure 10:
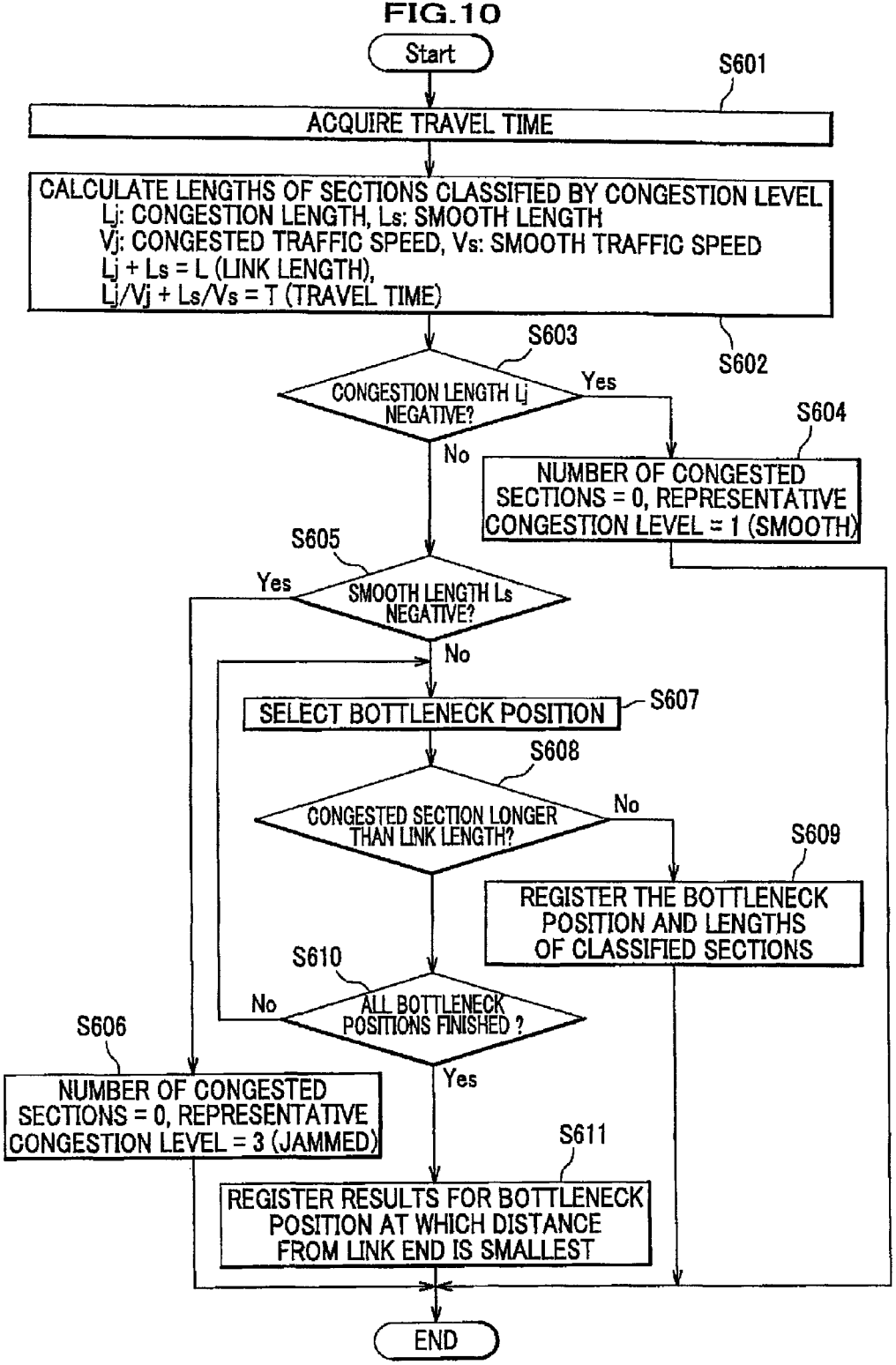
FIG. 10 is a flow diagram of the process of predicting congested sections.

FIG. 10 is a flow diagram of the process of predicting congested sections (S502).

First, the predictive parameter generator 23 acquires the travel time 320 of the link information piece 316 of interest.

Then, the predictive parameter generator 23 calculates a congestion length Lj and a smooth length Ls for the link of interest by solving the following simultaneous equations, where the congested traffic speed Vj and smooth traffic speed Vs read at S501 are used as the speed on congested sections and the speed on smooth sections. The length obtained from the map data is used as the link length.

The Simultaneous Equations:

$$Lj+Ls=L(\text{Link length}),$$

$$Lj/Vj+Ls/Vs=T(\text{Travel time}).$$

Next, the predictive parameter generator 23 examines whether the obtained congestion length Lj is negative (S603), and if negative (Yes at S603), the number of congested sections is registered as being 0 and the representative congestion level is registered as being 1 (smooth) (S604). Then, the flow of FIG. 10 is ended.

On the other hand, if the congestion length is positive (No at S603), the predictive parameter generator 23 examines whether the smooth length Ls is negative (S605), and if negative (Yes at S605), the number of congested sections is registered as being 0 and the representative congestion level is registered as being 3 (jammed) (S606). Then, the flow of FIG. 10 is ended.

In contrast, if the smooth length Ls is positive (No at S605), the predictive parameter generator 23 sequentially selects one from the bottleneck positions for the link in the bottleneck position table T312 (see FIG. 6) in the order of from highest (S607).

Then, the predictive parameter generator 23 determines whether the congested section is longer than the link length (S608). To be specific, it is examined that:

Bottleneck position(Distance from Link end point)+
Congestion length $Lj$>Link length, If true, it is determined that the congested section is longer than the link length, and if not, it is determined that the congested section is no longer than the link length.

If it is determined that the congested section is no longer than the link length (No at S608), the predictive parameter generator 23 registers the bottleneck position selected at S607 and the congestion length Lj and the smooth length Ls obtained at S602 (S609), and ends the flow of FIG. 10.

On the other hand, if it is determined that the congested section is longer than the link length (Yes at S608), the predictive parameter generator 23 examines whether all bottleneck positions of the link of interest in the bottleneck position table T312 have been selected (S610). If a bottleneck position having not been selected exists (No at S610), the process returns to S607, where the next registered bottleneck position is selected, and the later processes are performed. In contrast, if all bottleneck positions have been selected (Yes at S610), the predictive parameter generator 23 selects the bottleneck position at which the distance from the link end point is smallest from the bottleneck position table T312, and takes the distance from the link start point to the bottleneck position as the congestion length Lj and the distance from the bottleneck position to the link end point as the smooth length Ls. Then, the predictive parameter generator 23 registers the bottleneck position, the congestion length Lj, and the smooth length Ls (S611) and ends the flow of FIG. 10.

In the above, the process flow in FIG. 10 of predicting congested sections has been described.

Next, the calculation of an evaluated value E for the predicted congested sections (S503 of FIG. 9) will be described.

Figures 11, 12:
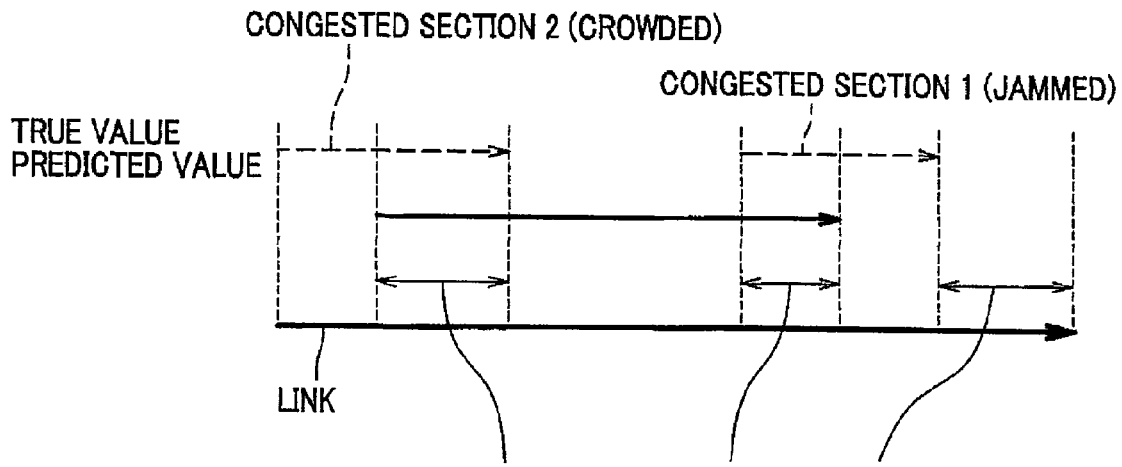
FIG. 11 illustrates the process of evaluating a predicted congested section.
FIG. 12 shows the configuration of a predictive parameter DB.

FIG. 11 illustrates the way to calculate an evaluated value E. The evaluated value E is the ratio of part where the true value and the predicted value match to the whole. The greater evaluated value E means better consistency. Here, the congested section information pieces 322 of the link information piece 316 of interest are used as the true values. The predictive parameter generator 23 compares the true values and the congestion states (sections classified according to their level of congestion) predicted at S502, obtains the lengths of parts where both the levels of congestion match, and obtains the sum Xi of them. Then, the predictive parameter generator 23 obtains an evaluated value E through the equation below. Herein, the congestion of 2 in level (crowded) and the congestion of 3 in level (jammed) are not distinguished but are considered as congestion.

In the example of FIG. 11, true values (congestion states obtained from the congested section information pieces 322 of the traffic information DB 310) are a congested section 1 (jammed) and a congested section 2 (crowded). Meanwhile, the congestion states predicted at S502 indicate that there is one congested section, which overlaps the congested section 2 and the congested section 1 from the true values. In such a case, the predictive parameter generator 23 obtains the lengths of the parts where the levels of congestion have a common value, that is, the parts where both are "jammed" or "crowded" and where both are "smooth". Then, the predictive parameter generator 23 obtains the sum Xi of those lengths, and obtains an evaluated value E by dividing the sum Xi by the link length as follows:

Evaluated value E=Xi/L, where Xi is the length of the matched sections and L is the link length.

Back to FIG. 9, description will be made. The predictive parameter generator 23 performs the processes of S502 to S503 for all link information pieces (i.e., all links and times of information creation 311) (S504).

Then, the predictive parameter generator 23 calculates the average Eave of the obtained evaluated values E (S505).

Next, the predictive parameter generator 23 determines whether all percentile values contained in the smooth and congested traffic speeds-for-different percentile values table 360 have been selected, and if one having not been selected exists, the process returns to S501 and continues.

In contrast, when the average Eave of the evaluated values E has been obtained for all percentile values (Yes at S506), the predictive parameter generator 23 obtains the percentile value for which the average Eave is greatest and decides the obtained percentile value to be an optimum percentile value for prediction (S507).

Then, the predictive parameter generator 23 determines an optimum smooth traffic speed and an optimum congested traffic speed for each link with use of the optimum percentile value for prediction decided at S507 (S509). To be specific, the predictive parameter generator 23 extracts, for each link, the smooth traffic speed and the congested traffic speed corresponding to the percentile value decided at S507 from the smooth and the congested traffic speeds-for-different percentile values table 360, and decides the extracted smooth traffic speed and the congested traffic speed to be an optimum smooth traffic speed and an optimum congested traffic speed. Thereafter, the flow of FIG. 9 is ended.

In the above, the process flow in FIG. 9 of evaluating smooth and congested traffic speeds for different percentile values has been described.

Next, the predictive parameter generator 23 creates the predictive parameter DB 370 (S600 of FIG. 5). FIG. 12 shows the configuration of the predictive parameter DB 370. The predictive parameter DB 370 comprises number of mesh information pieces 371 and an equal number of mesh information pieces 372 to the number of mesh information pieces 371. The mesh information piece 372 comprises a mesh code 373, number of link information pieces 374, and an equal number of link information pieces 375 to the number of link information pieces 374. The link information piece 375 comprises a link classification 376, a link number 378, a first bottleneck position 379, a second bottleneck position 380, a third bottleneck position 381, a congested traffic speed 382, and a smooth traffic speed 383.

The predictive parameter generator 23 stores three highest bottleneck positions for each link created at the bottleneck position calculation (FIG. 6) into the first to third bottleneck positions 379-381 of the corresponding link information piece 375 in the order of from highest, and further, stores the optimum congested traffic speed and the optimum smooth traffic speed for each link created at S508 of the evaluation of the smooth and congested traffic speeds for different percentile values (FIG. 9) into the congested traffic speed 382 and the smooth traffic speed 383 of the corresponding link information piece 375.

In the above, the process flow of creating the predictive parameter DB 370 shown in FIG. 5 has been described.

The usage of the predictive parameter DB 370 created in this way will be described.

The predictive parameters (the first to third bottleneck positions 379-381, the congested traffic speed 382, and the smooth traffic speed 383) stored in the predictive parameter DB 370 are used to predict sections classified according to their level of congestion in links, that is, to obtain the congestion states in the link (the levels of congestion of its sections) when the travel time for each link has been obtained from the predicted travel time server 13.

Figure 13:
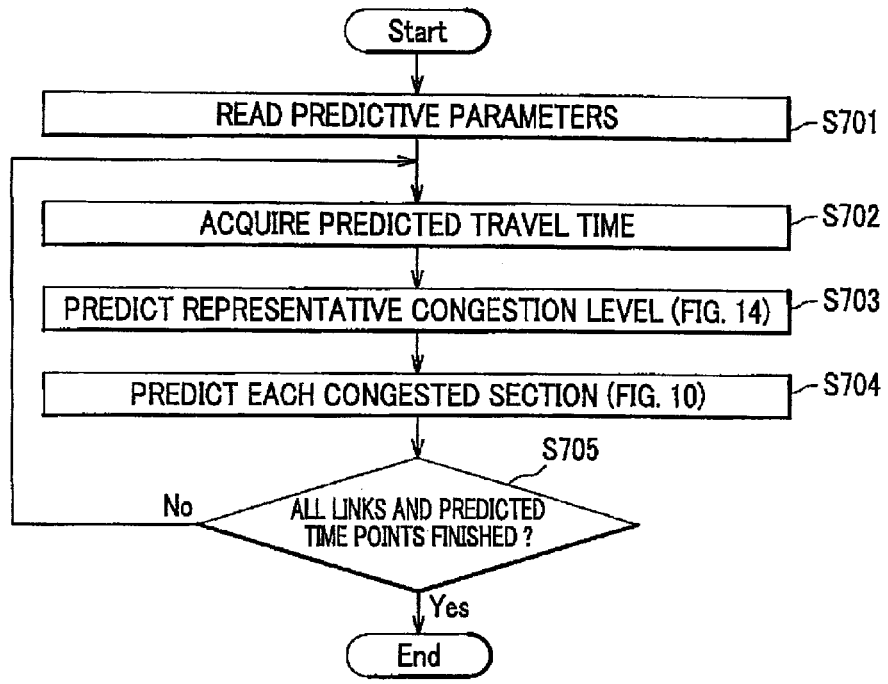
FIG. 13 is a flow diagram of the process of predicting congestion states.

FIG. 13 is a flow diagram of the prediction of congestion states. This flow starts when a travel time has been obtained from the predicted travel time server 13 or in response to a request from the in-vehicle device 12.

The predicted travel time acquiring portion 22 acquires traffic information including a predicted travel time for each link via the communication processor 21 from the predicted travel time server 13, and stores the acquired traffic information in the predicted traffic information DB 330. The acquired traffic information includes basically almost all of the information constituting the predicted traffic information DB 330 of FIG. 3. However, information on levels of congestion (the representative congestion level 342, the number of congested sections 344, and the congested section information 345) is not included.

Accordingly, the congested section predictor 24 calculates the information on levels of congestion based on a predicted travel time 343 received from the predicted travel time server 13 with use of the predictive parameters.

The congested section predictor 24 first reads in the predictive parameter DB 370 (S701), and for each number of predicting time points 332 and for each link, performs the processes of S702 to S704 on the predicted travel time 343, that is, sequentially selects one from the link information pieces 339 and performs the processes of S702 to S704 thereon.

At S702, the congested section predictor 24 acquires the predicted travel time 343 of the selected link information piece 339.

Figure 14:
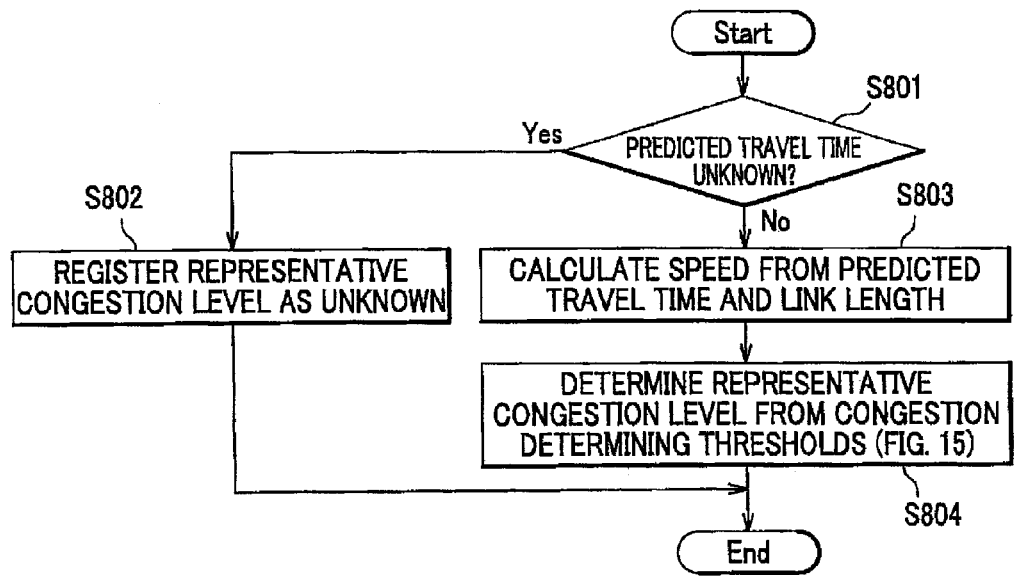
FIG. 14 is a flow diagram of the process of predicting a representative congestion level.

At S703, the congested section predictor 24 obtains the representative congestion level for the link corresponding to the selected link information piece 339. FIG. 14 is a flow diagram of the prediction of the representative congestion level.

The congested section predictor 24 registers "unknown" in the representative congestion level 342 if the predicted travel time is unknown, that is, the predicted travel time for the link has not been acquired from the predicted travel time server 13 (Yes at S801). In contrast, if the predicted travel time exists (No at S801), the congested section predictor 24 calculates a travel speed by dividing the link length by the predicted travel time 343 (S803), and determines the representative congestion level using a congestion determining threshold table of FIG. 15. The congestion determining threshold table has a range of travel speeds associated with each level of congestion for each link classification. The congested section predictor 24 obtains the level of congestion corresponding to the link classification 340 of the link of interest and the travel speed obtained at S803 from the congestion determining threshold table, and stores the obtained level of congestion in the representative congestion level 342.

Back to FIG. 13, description will be made. Next, the congested section predictor 24 predicts congested sections. The prediction of congested sections is the same as that shown in FIG. 10 except the congested section predictor 24 performs the prediction. Here, at S601, the predicted travel time 343 is acquired from the predicted travel time server 13. In the calculation of the congestion length at S602, the predicted travel time 343 is used as the travel time T.

If the number of congested sections=0 and the representative congestion level=1 (smooth) (S604), the congested section predictor 24 stores "0" in the number of congested sections 344 of the link information piece 339 of interest. The field of the congested section information piece 345 is not provided.

If the number of congested sections=0 and the representative congestion level=3 (jammed) (S606), the congested section predictor 24 stores "0" in the number of congested sections 344 of the link information piece 339 of interest. The field of the congested section information piece 345 is not provided.

If the length of the congested section is appropriate relative to the link length (S609), the congested section predictor 24 stores "1" in the number of congested sections 344 of the link information piece 339, provides one record of the congested section information piece 345, and stores "3 (jammed)" in the congested section level 346. Further, the congested section predictor 24 stores the bottleneck position selected at S607 in the bottleneck position 347 and the congestion length Lj obtained at S602 in the congestion length 348.

When the results are registered for the bottleneck position whose distance from the link end point is smallest (S611), the congested section predictor 24 stores "1" in the number of congested sections 344 of the link information piece 339, provides one record of the congested section information piece 345, and stores "3 (jammed)" in the congested section level 346 and the bottleneck position whose distance from the link end point is smallest in the bottleneck position 347. The distance from the link start point to the bottleneck position is stored in the congestion length 348.

Back to FIG. 13, description will be made. After performing the above processes (S702-S704) on traffic information received from the predicted travel time server 13 (for each number of predicting time points 332 and for the travel time 343 of each link stored in the predicted traffic information DB 330) (S705), the congested section predictor 24 ends this flow.

In this way, the predicted traffic information DB 330 as shown in FIG. 3 is completed. That is, the predicted traffic information DB 330 stores information on the congestion states (the representative congestion level 342, the number of congested sections 344, and the congested section information 345) that is not received from the predicted travel time server 13.

The communication processor 21 transmits the predicted traffic information DB 330 created in this way in response to a request from the in-vehicle device 12.

The in-vehicle device 12 can display the levels of congestion for the parts/sections of a link with use of the received, predicted traffic information DB 330 as well as the level of congestion on a per link basis.

One embodiment of the present invention has been described in the above.

According to the above embodiment, sections classified according to their level of congestion in links can be obtained from the respective travel times of the links. That is, even where only the respective predicted travel times for the links can be acquired as predicted traffic information, the levels of congestion for the parts/sections of a link can be predicted. Therefore, more detailed predicted traffic information can be provided.

Furthermore, predictive parameters are calculated using the stored traffic information that is past actual traffic information, and are used to predict the levels of congestion, thus enabling more accurate prediction.

Not being limited to the above embodiment, the present invention can be modified in various ways without departing from the scope thereof.

For example, in the above embodiment, when obtaining the congested section level, the congestion of 2 in level (crowded) and the congestion of 3 in level (jammed) are not distinguished but are both considered as the congestion of 3 in level (jammed). However, the congestion of 2 in level (crowded) and the congestion of 3 in level (jammed) may be distinguished.

For example, in creating the congested section information 345 of the predicted traffic information DB 330 at S704 of FIG. 13, the congested section predictor 24 may obtain the travel speed for the link by use of a similar process to S803 of FIG. 14 and obtain a level of congestion using the congestion determining threshold table of FIG. 15. Or, using the congested traffic speed Vj obtained at S602 as the travel speed, the predictor 24 may obtain a corresponding level of congestion using the congestion determining threshold table of FIG. 15 and store the obtained level of congestion in the congested section level 346. In the congestion determining threshold table of FIG. 15, the congestion of 2 in level (crowded) and the congestion of 3 in level (jammed) are distinguished. Hence, the 2 (crowded) is stored in the congested section level 346 depending on the travel speed. By this means, the in-vehicle device 12 can display "jammed" and "crowded" in a distinguished manner for the parts/sections of a link and thus can perform a variety of displays.

Although, in the above embodiment, the traffic information stored in the traffic information DB 310 is current traffic information received in the past, the traffic information may be statistical traffic information obtained by statistically processing past traffic information.

What is claimed is:

1. A traffic state predicting apparatus comprising:
    a processor configured to acquire traffic information on a predicted travel time for each of one or more links constituting a road on a map, sections in the link each having a determined level of congestion, a congestion reference position being a reference position for the section for which the level of congestion is determined, and a total section length of the sections for each of which the level of congestion is determined to be congested; and
    a processor configured to create parameters on each of the links based on which the sections in each of the links are obtained for which the level of congestion is determined, wherein the parameters include a smooth traffic speed indicating a threshold value of a traffic speed for which a level of congestion is determined to be smooth, a congested traffic speed indicating a threshold value of a traffic speed for which the level of congestion is determined to be congested, and congestion reference positions each of which is a reference position for a congested section,
    wherein the processor configured to create comprises:
        travel speed calculating means that obtains travel speeds for each level of congestion for each of the links;
        means for arranging the travel speeds for each level of congestion in ascending order or descending order and, for each level of congestion, acquiring travel speeds in predetermined percentiles of all the travel speeds;
        congestion degree classifying section calculating means that obtains sections into which each of the links is divided based on the predicted travel time and the parameters, each of the sections in each of the links having a determined level of congestion; and
        means for obtaining an evaluation value based on matching between the obtained sections and sections according to their level of congestion contained in the traffic information,
        wherein the travel speed for each level of congestion that gives the highest evaluated value is included in the parameters.

2. The traffic state predicting apparatus according to claim 1, wherein the congestion degree classifying section calculating means obtains the sections in each of the links, wherein a total of section travel times correspond to the predicted travel time for each of the links, each of the section travel times being a time to travel through each of the sections, and wherein a total of section lengths correspond to a link length of each of the links.

3. The traffic state predicting apparatus according to claim 1, further comprising:
    means for acquiring a representative travel speed of each of the links,
    wherein the travel speed calculating means uses the representative travel speed for the congested traffic speed if the total section length of the sections for each of which the level of congestion is determined to be congested is equal to or greater than a predetermined proportion of the link length of each of the links, and the representative travel speed for the smooth traffic speed if the total length of the sections for each of which the level of congestion is determined to be smooth is smaller than the predetermined proportion of the link length of each of the links.

* * * * *